United States Patent [19]
Sheldon et al.

[11] 3,943,289
[45] Mar. 9, 1976

[54] AUTOMATIC TELEPHONE CALLER

[75] Inventors: Norman A. Sheldon, Denver; Erwin L. Dosch, Lakewood, both of Colo.

[73] Assignee: Environmental Developers, Inc., Denver, Colo.

[22] Filed: July 12, 1974

[21] Appl. No.: 488,071

[52] U.S. Cl. .............................. 179/6 D; 179/90 B
[51] Int. Cl.² ........................................ H04M 1/44
[58] Field of Search ....... 179/6 D, 5 P, 90 B, 90 BB

[56] References Cited
UNITED STATES PATENTS

| | | | |
|---|---|---|---|
| 3,105,121 | 9/1963 | Field ................................. | 179/6 D |
| 3,301,958 | 1/1967 | Blakeslee et al. .................. | 179/6 D |
| 3,445,601 | 5/1969 | Whitely et al. ..................... | 179/6 D |
| 3,718,771 | 2/1973 | Bank ................................. | 179/90 B |

*Primary Examiner*—Vincent P. Canney
*Attorney, Agent, or Firm*—Lowe, King & Price

[57] ABSTRACT

A prerecorded message is supplied to a plurality of telephone subscriber numbers automatically called in sequence from a local station. Upon placing the call to the first number, another second number is established by changing the first called number by a predetermined increment. In response to the first called number being reached, the prerecorded message is coupled to a telephone line at the local station. In response to the call being either completed or the elapse of a predetermined time during which it is expected that the called subscriber should answer the phone, a signal is derived to indicate that operations for the first party have been terminated. In response to the termination signal, the telephone is repeatedly hung up and picked up automatically until the prerecorded message has been completed and a dial tone has been detected, at which time the second number is called. The device is activated repeatedly in this manner. Counters are provided to sense the number of completed calls, the number of calls in which the called subscriber hangs up prior to the end of the prerecorded message and the number of called subscribers who cannot be reached.

12 Claims, 3 Drawing Figures

AUTOMATIC TELEPHONE CALLER

FIELD OF THE INVENTION

The present invention relates generally to automatic telephony apparatus and more particularly to a device for automatically calling a relatively large number of subscribers in sequence and presenting a prerecorded message to each of the subscribers who answers the call.

BACKGROUND OF THE INVENTION

The dissemination of information to a large number of telephone subscribers such that each of the subscribers receives the same or approximately the same message has become widespread for various purposes, e.g., solicitation, advertising and data presentation. Typically, the calling and presentation of the message are performed manually by a salaried individual, thereby being relatively expensive. Also, manual dialing of a telephone is susceptible to mistakes and may result in calling of the wrong subscriber or the same subscriber being called twice in succession, with possible resulting deleterious effects on the business of the calling party.

While some devices have been designed to enable different telephone numbers to be automatically called in sequence wherein a predetermined message is presented to an answering called party, these devices have generally been utilized in conjunction with emergency warning devices. In particular, the devices have been utilized for automatically calling the numbers of police or fire departments or other parties that are responsive to an emergency situation. The prerecorded message presents information regarding the location where an emergency situation has been automatically detected by transducers such as burglary alarms, fire arms, or machinery monitoring devices.

The prior art automatic emergency calling devices, however, are not adapted to cope with certain circumstances that may result when a large number of telephone subscribers are called in sequence and presented with a prerecorded message. There is a very low probability in automatic emergency calling devices of premature hang up, i.e., the called subscriber hanging up on the prerecorded message prior to completion of the message. Also, the emergency calling devices are generally manually reset to the beginning of a message after the called party has answered and are not automatically reset to the beginning of a message prior to the next call being instigated.

Typically, the prior art devices are capable of calling only a relatively small number of subscribers. At least one of the emergency numbers being called is certain to be responsive to the call, since the called emergency numbers are fire departments, police departments, etc. Thereby, it is feasible to utilize a preprogrammed device whereon there are stored all of the numbers to be called in sequence. In many instances if a relatively large number of subscribers are to be called in sequence, the cost of storing all of the numbers on a preprogrammed device, such as a magnetic tape, may be prohibitive.

BRIEF DESCRIPTION OF THE INVENTION

In accordance with the present invention, at a local station there is provided a new and improved device connected to a telephone line for calling a relatively large number of remote telephone subscriber stations in sequence and presenting each of the answering subscribers with a prerecorded message. In accordance with one feature of the invention, the telephone number of subscribers called in sequence is changed by a predetermined number each time a new number is called. The number is changed by incrementing a register by a predetermined account, such as one, each time a subscriber number is called. Thereby, there is no need to provide a relatively costly preprogrammed medium for storing a large number of telephone numbers to be called.

It is recognized that there may be some bias on the part of a called subscriber to receiving a prerecorded telephone message and that there is a certain likelihood of the called answering subscriber hanging up prematurely. In the event of premature subscriber hang up, the local station is disconnected from the line, the prerecorded message is played back completely, stopped just prior to the beginning of the message, and is not begun again until a new subscriber has been reached. Thereby, the new answering subscriber is always initially presented with the beginning of the prerecorded message and the likelihood of his being attentive to the message is increased many fold.

In accordance with a further feature of the invention, circuitry is provided to detect: (1) the called subscriber not answering his receiver (because the called subscriber line was busy or did not answer his receiver), (2) a call was completed to the called subscriber and the called subscriber listened to the entire prerecorded message; and (3) the call was completed to the called subscriber and the called subscriber hung up prematurely. A counter is provided to provide an indication of the number of each of these three categories, thereby enabling a measure of the effectiveness of the device to be determined.

In accordance with another aspect of the invention, upon the termination of a completed call or upon an indication being derived that the called party could not be reached, the telephone line is repeatedly disconnected and connected to the local station until the prerecorded message cycle has been completed and a dial tone has been detected. In response to the prerecorded cycle being completed and the dial tone being detected, the apparatus is advanced so that the next number is automatically called. By repeatedly hanging up the local station and reconnecting the local station until detection of both a dial tone and completion of the prerecorded message cycle, the device of the present invention does not continuously load down the telephone line while it is not in use.

It is, accordingly, an object of the present invention to provide a new and improved automatic telephone dialing apparatus wherein a relatively large number of telephone subscribers are called in sequence.

Another object of the invention is to provide an automatic telephone dialing system for enabling prerecorded messages to be presented to subscribers to whom calls are completed, wherein the numbers of called subscribers are changed by a predetermined amount each time a new call is placed.

Another object of the invention is to provide an automatic telephone dialing apparatus wherein a prerecorded message is presented to subscribers to whom a call is completed and a record is maintained of the number of called subscribers who listen to the complete message, as well as the number of called subscribers who hang up prematurely.

Another object of the invention is to provide an apparatus for automatically calling a number of predetermined telephone subscribers and presenting a prerecorded message to subscribers to whom the call is completed, wherein the beginning of the message is always initially presented to the answering subscriber, regardless of whether the previously called subscriber listened to the entire message or only a portion of the message.

A further object of the invention is to provide a new and improved device for presenting a prerecorded message to telephone subscribers that are automatically called in sequence, wherein a new subscriber is called after the previously called subscriber has hung up or an indication is derived that the previously called subscriber did not answer his receiver.

A further object of the invention is to provide a new and improved apparatus for automatically calling telephone subscribers in sequence wherein there is a minimum line seizure time from the completion of the last call or a determination that the last call could not be completed to the initiation of the next call, even though the next call is not initiated until a dial tone is available and a prerecorded message has been completely played back so that the beginning of the message is initially supplied to the next called subscriber.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
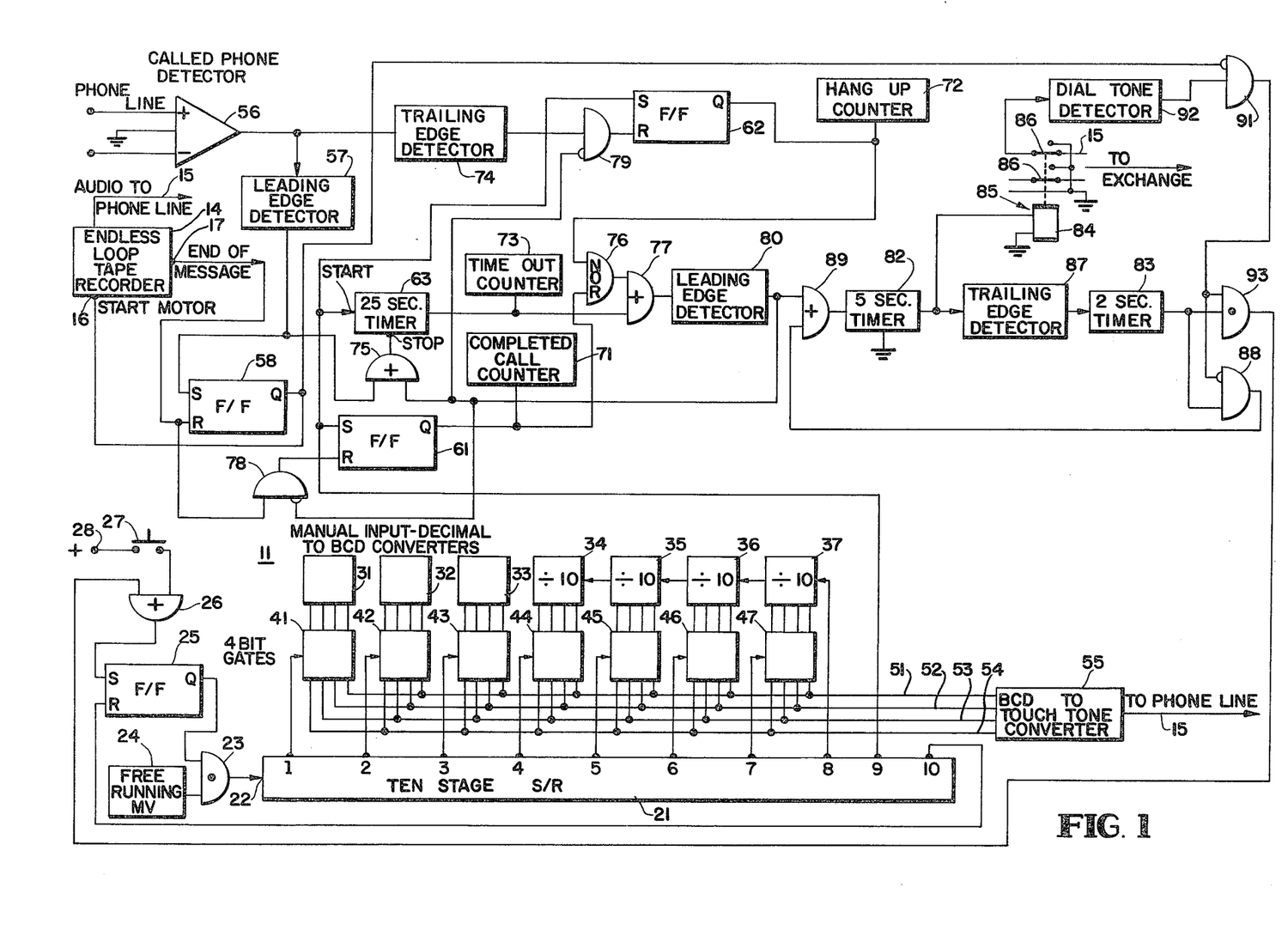
FIG. 1 is a block diagram of one embodiment of the present invention.

Reference is now made to FIG. 1 wherein there is illustrated a block diagram of a preferred embodiment of the local automatic telephone calling system of the present invention. The apparatus illustrated in FIG. 1 broadly includes four basic parts, a calling or number control circuit 11, a called detector 12, a ready for new call detector circuit 13, and endless loop tape recorder 14 on which is prerecorded a message which is to be transmitted over telephone line 15. Calling circuit 11 establishes the number of a telephone subscriber to be called and is automatically incremented by a count of one prior to the next call being instigated. Called detector circuit 12 is responsive to the called subscriber answering his receiver and includes circuitry for detecting whether the called subscriber: (a) answered the receiver and listened to the entire message, (b) answered the receiver and hung up his receiver prior to the recorded message being completed, and (c) was not reached within a predetermined time after the call was placed. The called subscriber may not have been reached because no one answered the receiver or because the line of the called subscriber was busy.

Ready for new call detector circuit 13 repeatedly disconnects and connects the receiver at the local, calling station to telephone line 15 to determine if a dial tone is available from the line. A dial tone can be available from telephone line 15 only after the prerecorded message has been completed, whereby the next called subscriber is always provided with the beginning of the prerecorded message at the beginning of the call. In response to detector circuit 13 sensing that the line is available and the recorded message from the last call being completed, calling circuit 11 is actuated, causing a new number of a telephone subscriber to be called.

Endless loop tape recorder 14 includes start-stop input terminal 16 which is responsive to a bi-level signal. In response to a binary one state being applied to the bi-level signal terminal 16, a motor included in the tape recorder is activated, causing the tape of the recorder to be driven through a complete cycle to feed the prerecorded message as an audio signal to telephone line 15. The motor in tape recorder 15 is driven until the endless loop of the tape recorder has completed a cycle, at which time the motor is stopped and the recorder motor is not started again until a further binary one level is coupled to terminal 16. To enable a complete cycle of the loop to be detected, the tape includes a foil that functions as a shorting element to signal the completion of a tape loop cycle. The recorder 14 includes internal circuitry, well known to those skilled in the art, to cause the motor to stop driving the tape in response to the foil being sensed. The signal to stop the motor of recorder 14 is applied in parallel to output terminal 17 to indicate that the tape has been driven through a complete cycle and that the message on the tape has been completed. The end of message signal derived from terminal 17 serves as an input to call detector circuit 12, enabling circuit 12 to determine if the called subscriber listened to the entire message or hung up in the middle of the message prior to completion thereof.

Calling circuit 11 includes a ten stage shift register 21 having a clock input terminal 22 responsive to the output of AND gate 23. AND gate 23 is responsive to a square wave output voltage of free running multivibrator 24, having a frequency of one Hertz. AND gate 23 is enabled in response to a binary one being derived from set output terminal (Q) of flip-flop 25. Flip-flop 25 includes a set input responsive to the output of OR gate 26, having an input that is selectively coupled through manually actuated start contact 27 to a positive voltage at terminal 28. OR gate 28 also includes an input from the output of ready for new call detector circuit 13, whereby a binary one level is derived from OR gate 26 either in response to manual, initial actuation of contact 27 or in response to detector circuit 13 indicating that telephone line 15 is available and that the prerecorded message from the last call has been completed.

The binary one output of OR gate 26 activates flip-flop 25 to a set state, where it remains until a binary one signal is applied to a reset input of the flip-flop from the output of the tenth stage of register 21. In response to flip-flop 25 being activated to the reset state, AND gate 23 is disabled and the rectangular wave output of free running multivibrator 24 is not applied to clock input terminal 22 of shift register 21. Thereby, shift register 21 is cycled through its 10 stages for a time period lasting approximately 10 seconds.

The first seven stages (stages 1-7) of shift register 21 enable the seven digits of a seven digit telephone subscriber number to be actuated in sequence, similarly to manually actuating a touch tone or dial actuated telephone hand set. The number called is determined by the state of three manually actuated decimal to four bit binary decimal converters 31, 32 and 33, as well as the state of four cascaded divide by ten frequency dividers 34, 35, 36 and 37, each of which derives a four bit binary coded decimal signal. Converters 31–33 are manually actuated to the exchange desired to be called and thereby derive output signals commensurate with the numerals of the first three digits of a seven digit subscriber number.

Cascaded frequency dividers 34–37 are automatically advanced in sequence immediately after the last call was placed. To this end, the output of stage eight of shift register 21 is applied to an input of frequency divider 37, whereby the digital count in divider 37 is incremented by a count of one after the seven digits for the last called number have been dialed. By incrementing the count of divider 37 by a count of one the last digit of a seven digit telephone subscriber number is advanced by a count of one. Counters 34–37 are activated so that if the device is left in operation for a sufficiently long period of time 10,000 digital numbers are derived in sequence from dividers 34–37 to represent the 10,000 different numbers of the exchange manually entered into converters 31–33. Each of converters 31–33 and dividers 34–37 includes internal connections for converting the digital numbers therein into binary coded decimal numbers representing the digital numbers. To this end, each of converters 31–33 and dividers 34–37 includes four separate counter stages, each of which has an output lead on which is derived a bit of the binary coded decimal signal.

To read out the seven digits of the number of a called subscriber, seven four bit gates 41–47 are provided. Each of gates 41–47 includes an enable input terminal, which when driven into a binary one state causes four bits to be passed from the four input terminals to the four output terminals of each of the gates. The four input terminals of each of gates 41–47 are respectively connected to the four output terminals of converters 31–33 and frequency dividers 34–37. Gates 41–47 are respectively connected to output terminals of stages 1–7 of shift register 21, whereby gates 41–47 are activated in sequence. Corresponding output terminals of gates 41–47 derive signals for corresponding binary orders of the four bit binary coded decimal signal supplied thereto. Output leads of gates 41–47 carrying signals for the same ordered bit are connected together so that the signals on leads 51, 52, 53 and 54 indicate the presence or absence of a binary signal respectively representing $2^0$, $2^1$, $2^2$ and $2^3$.

The signals on leads 51–54 are applied to binary coded decimal to touch tone converter 55 which derives output signals having ten different frequencies representing the tones of a touch phone. The multi-frequency signal derived from converter 55 is applied to telephone line 15. The seven derived binary coded decimal signals are sequentially applied by leads 51–54 to converter 55 as register 21 is shifted through stages 1–7 so that seven tones are sequentially supplied by converter 55 to telephone line 15. In the alternative, the binary code decimal to touch tone converter 55 can be replaced with a binary coded decimal to dialing pulse converter, as discussed in detail infra.

After the seven digit called subscriber number has been applied to phone line 15 and the number of the next called subscriber has been entered into dividers 34–37, shift register 21 is advanced to stage nine, causing called detector circuit 12 to be activated. Called detector circuit 12 includes differential, D.C. operational amplifier 56 that derives a bi-level signal. Operation amplifier 56 includes a ground input terminal connected to a ground line of telephone line 15, a positive input terminal connected to the tip line of the telephone line, and a negative input terminal connected to the ring line of a telephone line. Amplifier 56 is relatively easily saturated to derive a positive output voltage in response to phone line 15 being initially connected to a subscriber station. When phone line 15 is disconnected from a subscriber station, the polarity of the tip and ring lines is reversed, causing the output of operation amplifier 56 to be driven to a negative voltage. Thereby, a positive going, leading edge is derived at the output of amplifier 56 in response to the called subscriber picking up his receiver, and a negative going, trailing edge is derived from the amplifier when the called subscriber hangs up his receiver.

In response to the called subscriber picking up his receiver, the prerecorded message of tape recorder 14 is supplied to telephone line 15 by supplying a binary one signal to terminal 16 of recorder 14. To this end, leading edge detector 57 is connected to be responsive to the output of operational amplifier 56. Leading edge detector 57 includes a differentiator and diode poled so that a pulse is derived from the detector only in response to the positive going, leading edge of the output signal of amplifier 56, as occurs in response to the called subscriber picking up the receiver. The output pulse of detector 57 is applied to a set input terminal (S) of flip-flop 58, having a set output terminal (Q) which is connected to start-stop input terminal 16 of recorder 14. Flip-flop 58 includes a reset input terminal (R) responsive to the end of message signal derived from terminal 17 of recorder 14. Thereby, flip-flop 58 is activated into a binary one state to derive a binary one output at its set output terminal for the entire time that the tape of recorder 14 is being driven through a cycle.

The bi-level output of amplifier 56, the end of message output signal at terminal 17 of tape recorder 14, and the signal derived from stage nine of register 21 are supplied to call detector circuit 12 to control the activation of flip-flops 61 and 62, as well as timer 63. Flip-flops 61 and 62, and inhibit gates 64 and 65, respectively connected to the set (Q) output terminals of the flip-flops, are provided to detect whether or not the called subscriber listened to the entire prerecorded message of recorder 14. Timer 63 and inhibit gate 66, connected to the timer output, are provided to determine if the called subscriber failed to answer his receiver, either because the receiver of the called subscriber was busy or was not picked up in a reasonable time (e.g., 25 seconds) when called. For each called subscriber, one of counters 71, 72 or 73, respectively connected to the output terminals of inhibit gates 64, 65 and 66, is activated to enable a record to be made of how many called subscribers (1) listened to the entire message, (2) hung up before the message was completed and (3) failed to pick up the receiver. Counters 71–73 respond to the trailing edges of the output pulses of inhibit gates 64–66 since only the trailing edges indicate which one of the three possible events took place for a particular called subscriber.

To these ends, set input terminals (S) of flip-flops 61 and 62 and a start input terminal of timer 63 are driven in parallel by the output signal of stage nine of shift register 21. The output signal of stage nine drives flip-flops 61 and 62 so that the flip-flops derive binary one signals at the set output terminals (Q) thereof until pulses are applied to the reset input terminals thereof. In contrast, the state of timer 63 is not altered by an output of stage nine until the timer period has elapsed (25 seconds), at which time a pulse on the order of one second is derived, unless the timer has been stopped. Reset input terminal (R) of flip-flop 61 is connected to be responsive to the end of message signal derived from terminal 17 of recorder 14, while the reset terminal (R) of flip-flop 62 is connected to be responsive to an output signal derived from trailing edge detector 74 that has circuitry substantially the same as that of leading edge detector 57, except for reversal of the diode polarity. Thereby, flip-flop 61 is activated to the binary one state from the time a binary one level is derived from stage nine of shift register 21 until the tape of recorder 14 has completed one cycle, while flip-flop 62 is in the binary one state from the time a binary one is derived from stage nine of shift register 21 until the called subscriber hangs up his receiver.

Timer 63 includes a stop input terminal, which when activated stops the timer and resets it to zero. Hence, a pulse is derived from timer 63 only if there is a 25 second interval between the time a pulse is applied from stage nine to the timer start input terminal and a pulse is applied to the stop input terminal of the timer. To prevent an output pulse from being derived from timer 63 when the called subscriber picks up his receiver, the stop input terminal of the timer is connected to be responsive to the output of leading edge detector 57 by a connection established through OR gate 75.

To enable only one of flip-flops 61 or 62 or timer 63 to derive a binary one level in response to each called subscriber being dialed, and thereby enabling only one of counters 71–73 to be activated for each called subscriber, a feedback circuit is provided between the outputs of the flip-flops and timer and the reset inputs of the flip-flops and the stop input terminal of the timer. The feedback circuit includes NOR gate 76, having inputs responsive to the set output terminals (Q) of flip-flops 61 and 62. NOR gate 76 drives one input terminal of OR gate 77, having a second input terminal responsive to the output signal of timer 63. Thereby, a binary one level is derived from OR gate 77 in response to either of flip-flops 61 or 62 being activated to the reset state or timer 63 generating an output pulse. Leading edge detector 80 is connected to be responsive to the output of OR gate 77 to generate a pulse in response to the output of the OR gate going from a binary zero to a binary one level. The pulse is substantially in time coincidence with: (1) the completion of the 25 second interval as derived from the output of timer 63, (2) the premature hanging up by the called subscriber, as derived by the output of flip-flop 62, or (3) the termination of the prerecorded message with the called subscriber listening to the entire message, as indicated by the output of flip-flop 61, whichever one of the three is appropriate. Detector 80 derives an output signal that is coupled to the stop input terminal of timer 63 through OR gate 75 and to inhibit input terminals of inhibit gates 78 and 79, respectively connected to the reset input terminals (R) of flip-flops 61 and 62.

The circuitry including flip-flops 61-62, timer 63, OR gates 75 and 77, NOR gates 76 and inhibit gates 78 and 79 and detector 80 operates as follows. The binary one signal from stage nine of shift register 21 sets flip-flops 61 and 62 and initiates the operation of timer 63. Thereby, flip-flops 61 and 62 derive binary one output signals, while no pulse is derived from timer 63. If the called subscriber does not pick up his receiver within 25 seconds, a pulse is derived from timer 63, actuating counter 73, and is coupled through OR gate 77 to cause a pulse to be derived from detector 80. The pulse output of detector 80 is coupled to the inhibit terminals of inhibit gates 78 and 79, thereby preventing resetting of the flip-flops in response to the next output of OR gate 77. If the called subscriber picks up his receiver prior to completion of the 25 second period of timer 63, a binary one signal is derived from leading edge detector 57 and coupled through OR gate 75 to the stop input terminal of timer 63, thereby preventing a pulse from being derived from the output of the timer whereby counter 73 is not activated.

When the answering called subscriber hangs up before the message is completed a pulse is derived from trailing edge detector 74 and coupled through gate 79 to the reset input terminal of flip-flop 62. Thereby, flip-flop 62 is activated to the reset state and hang up counter 72 is incremented by a count of one. In response to flip-flop 62 being activated to the reset state, a binary zero level is applied to one input of NOR gate 76, whereby the NOR gate derives a binary one output that is coupled through OR gate 77 to leading edge detector 80 that derives a pulse which is fed to the inhibit terminals of inhibit gates 78 and 79, and through OR gate 75 to the stop terminal of timer 63. Thereby, flip-flops 61 and 62 are respectively maintained in the set and reset states until the next number is called, at which time a binary one level is derived from stage nine of shift register 21, causing both flip-flops to be driven back to the set state.

Next assume that the called subscriber answered his receiver and listened to the entire prerecorded message transmitted over telephone line 15 from tape recorder 14. In such an event, an output pulse is derived from end of message terminal 17 of tape recorder 14 prior to the derivation of a pulse from trailing edge detector 74. In response to the end of message pulse being derived from terminal 17, flip-flop 61 is reset, resulting in a binary one being derived at the output of NOR gate 76 and being coupled to the output of OR gate 77. The binary one at the output of OR gate 77 is supplied to detector 80 that generates a pulse that is supplied in parallel to inhibit inputs of gates 78 and 79, as well as one of the inputs of OR gate 75. Thereby, flip-flops 61 and 62 remain respectively activated in the reset and set states and timer 63 remains deactivated until the next subscriber number has been called and a binary one is again derived at output stage nine of shift register 21. Counter 71 is incremented in response to flip-flop 61 being driven to the reset state and neither of the counters 72 or 73 is incremented since there can be no change in state of the circuits driving them until after the next subscriber call is placed.

In response to a binary one output being derived from detector circuit 80, the phone at the local station is repeatedly disconnected from and connected to line 15, i.e., hung up and picked up, until a dial tone is detected and the entire cycle of tape recorder 14 has been completed. The repeated hanging up and picking up of the local phone is attained with circuit 13 which includes a feedback loop including electro-mechanical timers 82 and 83, preferably having timing periods of five seconds and two seconds, respectively. Timer 82 derives a 5 second binary one output pulse in response to a binary one being applied to its input, while timer 83 derives a short duration pulse 2 seconds after a binary one is applied to its input.

The input of timer 82 is responsive to the output of leading edge detector 80, as coupled through OR gate 89, to initiate the repeated hang up and pick up cycle. The 5 second output pulse of timer 82 is applied to coil 84 of relay 85, having normally closed contacts 86 which are connected to the tip and ring lines of telephone line 15. In response to the 5 second output pulse of timer 82, coil 84 is energized, opening contacts 86 and thereby disconnecting the local phone from line 15 for 5 seconds. Upon completion of the 5 second interval of timer 82, a binary zero output of the timer results in de-energization of relay 84 and closure of contacts 86, thereby connecting the local phone to line 15. If the local phone is not able to detect a dial tone on line 15 or an end of message pulse is not derived from lead 17 within 2 seconds after closure of contacts 86, contacts 86 are again open circuited and the local phone is again effectively hung up.

To detect when the local phone is reconnected to telephone line 15 and to enable the local phone to be connected to the line for at least 2 seconds, the output signal of timer 82 is coupled to trailing edge detector 87 which derives a relatively short duration binary one pulse in response to the output of timer 82 going from a binary one to a binary zero level. The output pulse of detector 87 is applied to timer 83. If a dial tone is not detected by detector 92 and the cycle of recorder 14 has not been completed, the pulse derived from timer 83 is coupled through inhibit gate 88 and OR gate 89 back to the input of timer 82. Timers 82 and 83 and contacts 86 are repeatedly activated in this manner until a dial tone on line 15 is detected and the cycle of recorder 14 has been completed. At that time, a binary one signal is derived from inhibit gate 91 to prevent the output of timer 83 from being fed back to the input of timer 82, causing the hang up - pick up cycle to be terminated.

To enable a binary one output to be derived from inhibit gate 91 in response to a dial tone being detected and the message on recorder 14 being completed, dial tone detector 92 is provided and connected to the tip or ring line of telephone line 15. Dial tone detector 92 is preferably a bandpass filter capable of passing any dial tone frequency, typically between 300 and 900 Hertz. The bandpass filter drives an audio detector which derives a binary one while any dial tone frequency is on line 15. The binary one output level of detector 92 is coupled through inhibit gate 91 only when the present message of recorder 14 has been completed. The binary one output of detector 92 is not coupled through inhibit gate 91 while the message of recorder 14 is being applied to the phone line 15 because the message may include audio frequencies that are the same as the dial tone, and to avoid placing a call to the next subscriber until after recorder 14 has completed a message cycle. To prevent the output of detector 92 from being coupled through gate 91 until the message of recorder 14 has been completed the set output terminal (Q) of flip-flop 58 is applied to the inhibit terminal of gate 91.

In response to a binary one output of inhibit gate 91, inhibit gate 88 is disabled, as indicated supra, to prevent further hanging up and picking up of the local telephone to telephone lines 15. The local telephone remains connected to lines 15 since relay 84 cannot be activated until a pulse is again derived from leading edge detector 80. A binary one output of inhibit gate 91 also enables AND gate 93 that is responsive to the output of 2 second timer 83.

In response to an output signal of timer 83 while a binary one output is derived from inhibit gate 91, AND gate 93 applies a binary one signal to a reset input terminal (R) of flip-flop 25 via OR gate 26, thereby enabling the output signal of free running multivibrator 24 to be applied to the clock input terminal 22 of shift register 21 to repeat the cycle.

Figure 2:
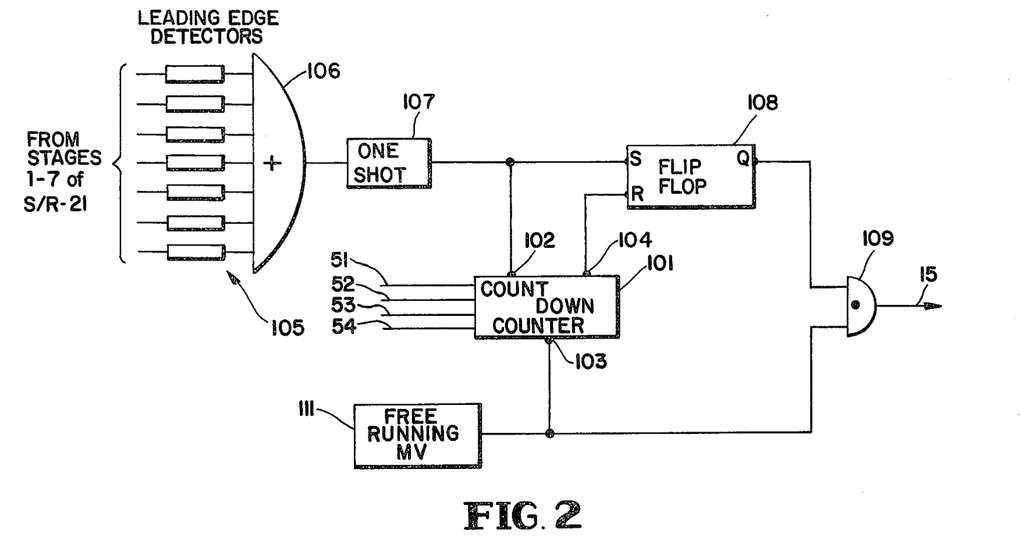
FIG. 2 is a circuit diagram of an alternate circuit for deriving dialing pulses, instead of touch tones.

Reference is now made to FIG. 2 of the drawing wherein there is illustrated a circuit diagram of a modification of the FIG. 1 system, enabling dialing pulses to be generated instead of touch tones. In the dialing pulse generator, each of the seven digits is represented as a series of dialing pulses, rather than as a tone. The dialing pulse generator includes a four stage count down counter 101 having a load input terminal 102 which, when actuated, causes the four bit binary coded decimal signal on leads 51–54 (FIG. 1) to be loaded into the four stages of the counter. Counter 101 includes a clock input terminal 103 which decrements the count of the counter one each time a pulse is applied thereto. Counter 101 includes an output terminal 104 on which is derived a binary one signal in response to the count of the counter being reduced to zero.

Counter 101 is loaded with the four bit binary coded signal on leads 51–54 each time shift register 21 is activated to a different one of stages 1–7. To this end, the output leads of stages 1–7 of shift register 21 are respectively connected to leading edge detectors 105, one of which is provided for each of the seven stages. The output voltages of leading edge detectors 105 are supplied to OR gate 106 which thereby derives a binary one output signal approximately in synchronism with each stage of shift register 21 being initially reached. The output of OR gate 106 is coupled to load input terminal 102 of counter 101 via one shot 107 which slightly delays the derivation of a binary one signal from OR gate 106, to prevent possible false coupling of a load signal into counter 101.

In the interval between loading of counter 101 and the derivation of a binary one signal at output terminal 104, the circuit of FIG. 2 derives a number of dialing pulses equal to the count of the binary coded decimal signal loaded into the counter. To sense the duration of the interval, the output of one shot 107 is applied to a set input terminal (S) of flip-flop 108 having a reset input terminal (R) connected to be responsive to the signal derived from terminal 104. Flip-flop 108 derives a binary one output signal at a set output terminal (Q) thereof which is coupled to one input of AND gate 109. AND gate 109 has a further input responsive to an output of fixed frequency, free running multivibrator 111, having an output that is applied to clock input terminal 103 of counter 101 to decrement the count loaded into the counter. To enable count down of a maximum count of ten and simulation of telephone dialing pulses, the frequency of free running multivibrators 24 is appropriately changed from the one Hertz rate of FIG. 1 and the frequency of multivibrator 111 is set to equal that of dialing pulses of a rotary telephone dialer.

Dialing pulses from free running multivibrator 111 are coupled to telephone line 15 through AND gate 109 while flip-flop 108 is in the set state. The number of dialing pulses coupled to line 15 from multivibrator 111 during each digit of a seven digit called number is equal to the digital value of the binary one coded signal coupled by leads 51–54 to the four stages of counter 101.

The use of operational amplifier 56 in response to a polarity reversal is suitable only with certain telephone exchanges. At other exchanges, where cross bar or solid state switching is employed, polarity reversal is not used. At such exchanges it has been found that immediately prior to ringing, one or two pulses are derived; if there are two pre-ringing pulses, they are separated by approximately ninety milliseconds. The pre-ringing pulses are followed by another pulse when the called subscriber picks up his receiver and a further pulse is derived when the called subscriber hangs up his receiver. These pulses are of relatively high level, being approximately ten times the levels of a dial tone, a ringing pulse, a touch tone, or an audio message.

To enable detection of connect, disconnect and prerringing pulses, telephone line 15 is connected to one input terminal of operational amplifier 121 (FIG. 3), having a second input responsive to a predetermined D.C. threshold voltage. Operational amplifier 121 normally derives a low level binary zero output signal, but is driven into saturation, to derive a binary one output signal, in response to the signal on line 15 having an amplitude commensurate with the pre-ringing, connect and disconnect pulses. In response to a dial tone, ringing pulse, touch tone or audio message, amplifier 121 remains in an unsaturated state and derives a binary zero level.

Figure 3:
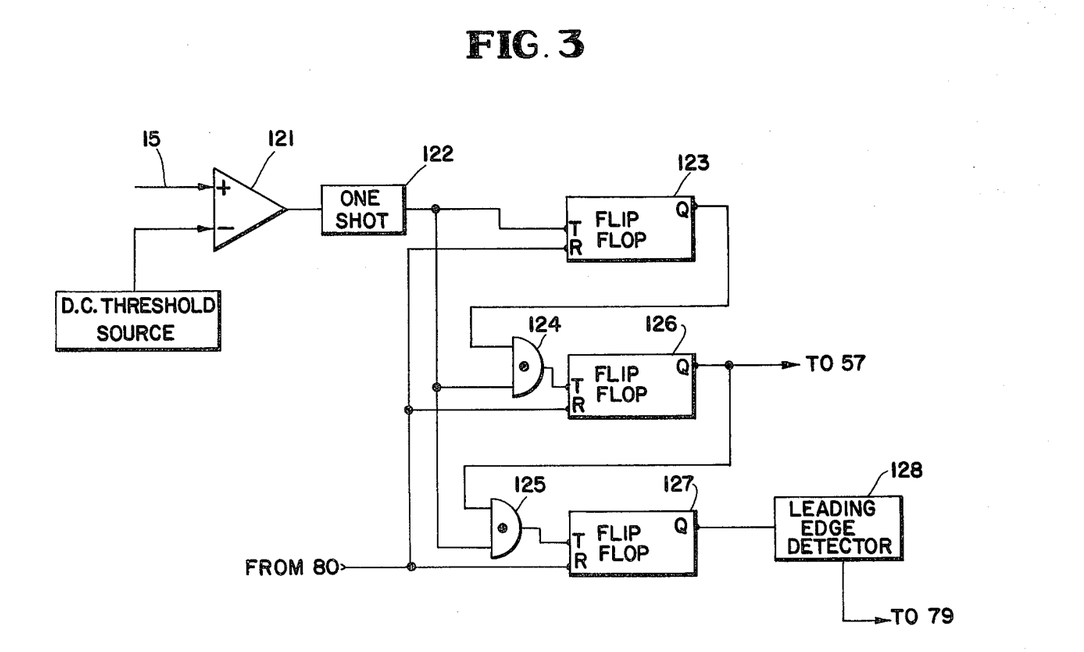
FIG. 3 is a circuit diagram of an alternate disconnect circuit which is adapted for use at virtually all exchanges.

The output signal of operational amplifier 121 is connected to an input of one shot multivibrator 122 which generates a binary one pulse having a duration in excess of the time separation between a pair of preringing pulses; e.g., the pulse duration is 150 milliseconds. Thereby, in response to either a pre-ringing pulse, or a pair of pre-ringing pulses, whichever is appropriate for the exchange to which the local telephone is connected, one shot multivibrator 122 derives a single output pulse having a leading edge synchronized with the first pre-ringing pulse and a duration of 150 milliseconds. In response to each of a connect and disconnect pulse being received on line 15, one shot 122 derives a 150 millisecond binary one output signal. Thereby, in response to a complete cycle of ringing, call completion and call disconnect, three and only three pulses are derived from one shot 122.

To enable detection of the called subscriber receiver being connected to and disconnected from the telephone line, the output of one shot 122 is applied to a trigger input terminal (T) of flip-flop 123, as well as to inputs of AND gates 124 and 125 which respectively drive trigger inputs (T) of flip-flops 126 and 127.

Flip-flops 123, 126 and 127 are interconnected with each other and the outputs of one shot 122 and AND gates 124 and 125 so that flip-flop 126 is in a binary one state during the entire time while the called subscriber receiver is connected to the telephone line, while flip-flop 127 is in a set state from the time that the called subscriber hangs up his receiver to the time a binary one signal is derived from detector 80, FIG. 1. To these ends, the output of flip-flop 123 is connected to one input of AND gate 124 and the output of flip-flop 126 is connected to one input of AND gate 125. Flip-flops 123, 126 and 127 are responsive to the trailing edges of the output of one shot 122. The three flip-flops include reset input terminals (R) which are connected to be responsive to the output of leading edge detector 80 so that all three of the flip-flops are in a binary zero state prior to a call being placed to each called subscriber.

Immediately prior to the receiver of the called subscriber having ringing pulses supplied thereto, flip-flop 123 is driven from the reset to the set state in response to the output of one shot multi-vibrator 122. Setting flip-flop 123 enables AND gate 124 so that when the called subscriber picks up his receiver and is connected to the line, the output pulse of one shot 122 is coupled through AND gate 124 to the toggle input of flip-flop 126, causing flip-flop 126 to be driven from the reset to the set state and disabling AND gate 125. In response to one shot 122 sensing a connection to the called subscriber, flip-flop 123 is returned to the reset state, thereby diabling AND gate 124. In response to the called subscriber hanging up his receiver and disconnecting his receiver from the line, one shot 122 derives a further binary one signal that is coupled through AND gate 125 to the toggle input of flip-flop 127, thereby changing the state of flip-flop 127 from the reset to the set state. The output pulse of one shot multivibrator 122 derived in response to the disconnect pulse on line 15 causes flip-flop 123 to be driven from the reset to the set state, but has no effect on the state of flip-flop 126 because the time required for flip-flop 123 to be reset is such that the trailing edge of the one shot 122 terminates prior to AND gate 124 being enabled.

The ring detection circuit of FIG. 3 is utilized in conjunction with the apparatus of FIG. 1 by connecting the output of flip-flop 126 to leading edge detector 57. The output of flip-flop 127 is connected to a leading edge detector 128 which senses transitions from a binary zero to a binary one state of flip-flop 127 and is utilized in place of trailing edge detector 74, FIG. 1.

While there has been described and illustrated one specific embodiment of the invention, it will be clear that variations in the details of the embodiment specifically illustrated and described may be made without departing from the true spirit and scope of the invention as defined in the appended claims. For example, the incremental dialing system wherein the number is changed by a fixed amount can be replaced with a prerecorded sequence of called numbers. Also, a pair of tape recorders can be provided, one for transmitting messages and a second for receiving short duration responses from called subscribers. The apparatus can also be provided with timers for automatically controlling the time of day during which calls are placed. In accordance with a further modification, the counts stored in frequency dividers 34–37 can be detected and compared against a maximum count which, when reached, causes an alarm to be activated and inhibits the enabling of AND gate 123 so that subscribers will not be repetitively called. Also, endless loop tape recorder 14 can include two tracks, one for the audio message and the second replacing the foil for control functions. On the control track, predetermined frequencies can be provided, with a first predetermined frequency indicating the completion of a message, causing the tape drive motor to stop. A few seconds prior to the "completion of message" frequency the control track can include a second frequency, distinguishable from the completion of message frequency, and indicating that the message is about to be completed. The "about to be completed" frequency can be detected and coupled to output terminal 17 so that if the called subscriber hangs up slightly before the message is completed the completed call counter 71, rather than hang up counter 72, is actuated.

What is claimed is:

1. Apparatus for automatically supplying a prerecorded message to a plurality of telephone subscriber stations in sequence comprising means for placing a telephone call to a telephone number, means for coupling the message to a telephone line in response to the called number being reached, counter means for storing the number to be called, means for incrementing the counter means by the same predetermined number to change the telephone number by a predetermined number to derive another number, and means responsive to the call being either completed or an indication of the called number being incapable of being reached for again activating the means for placing a call to the another telephone number; the means for placing, means for coupling, means for incrementing and means for again activating being repeatedly activated so that calls are automatically placed in sequence to a plurality of subscribers.

2. The apparatus of claim 1 wherein the counter means comprises a plurality of cascaded 10-stage frequency dividers, one of said dividers being provided for and storing the numerical value of a digit of a called subscriber number, whereby the plural dividers store plural digits of the called subscriber station number, means for incrementing the divider for the least significant bit once each time a number is called, a telephone dialing means, and means for supplying the stored digits of the dividers to the dialing means in sequence.

3. The apparatus of claim 1 wherein the counter means comprises: a shift register, an oscillator for advancing the shift register so that different shift register stages are activated in sequence, means for storing binary signals representing the digits of a called subscriber number, said means for storing for at least some of the digits comprising a plurality of cascaded 10-stage frequency dividers, telephone dialing means, gate means for selectively coupling the stored signals for each digit in sequence to the dialing means in response to different stages of the shift register being activated, and means for advancing the count of the frequency divider for the least significant digit by a count of one in response to a further one of said stages of the shift register being activated.

4. Apparatus for automatically supplying a prerecorded message via a telephone line to a plurality of telephone subscriber stations in sequence, said line applying pulse-type signals to the apparatus in response to an operator at a called subscriber station connecting and disconnecting his station to the line, comprising means for placing a telephone call to a telephone number, means responsive to the pulse-type signals for deriving first and second signals respectively indicative of a connection being completed to the called subscriber station and the connection being broken at the called subscriber station, means for coupling the message to a telephone line in response to the first signal being derived, means responsive to the recorded message being completed for deriving a third signal, and counter means responsive to the second and third signals for indicating the number of connected subscriber stations that did not stay on the line for the entire message, means for deriving a fourth signal in response to a connection not being established to the called subscriber station a predetermined time after the call was placed, means for changing the telephone number by a predetermined number to derive another number, and means responsive to the occurrence of the third or fourth signals for again activating the means for placing a call to the another telephone number; the means for placing, means for coupling, means for changing and means for again activating being repeatedly activated.

5. The apparatus of claim 4 wherein the means for deriving the first and second signals includes means for detecting voltage changes and polarity reversals on the telephone line.

6. The apparatus of claim 5 wherein the detecting means includes a saturable amplifier having a grounded reference terminal and a pair of complementary input terminals connected to tip and ring lines of the telephone line.

7. Apparatus for automatically supplying a prerecorded message via a telephone line to a plurality of telephone line subscriber stations in sequence, said line applying pulse-type signals to the apparatus in response to an operator at a called subscriber station connecting and disconnecting his station to the line, comprising a dial tone detector for deriving an enabling signal in response to a dial tone on the line being coupled to the apparatus, means responsive to the pulse-type signals for deriving first and second control signals respectively indicative of the called subscriber station connecting and disconnecting his station to the line, means for deriving a third control signal in response to the prerecorded message being completed, means for deriving a fourth control signal in response to a called subscriber not connecting his station to the line a predetermined time after having been called by the apparatus, means for deriving a plurality of dialing signals for the subscriber stations to be called, control means responsive to the first, second, third and fourth control signals for supplying the enabling signal to the means for deriving the dialing signals so that the dialing signal for each subscriber station to be called is applied to the line in response to the enabling signal being supplied to the means for deriving dialing signals, means for changing the dialing signal from one subscriber station number to another subscriber station number after a previous subscriber station number dialing signal has been applied to the line, means responsive to the first signal for supplying the message to the line, the control means being repeatedly activated in response to at least one of the control signals so that a plurality of subscriber station numbers are called in sequence.

8. The apparatus of claim 7 wherein the means for deriving the first and second signals includes means for detecting voltage changes and polarity reversals on the telephone line.

9. The apparatus of claim 8 wherein the detecting means includes a saturable amplifier having a grounded reference terminal and a pair of complementary input terminals connected to tip and ring lines of the telephone line.

10. The apparatus of claim 7 wherein the control means includes: means responsive to the derivation of either the second or fourth signals for repeatedly connecting and disconnecting the dial tone detector to the line until the dial tone enabling signal is supplied to the means for deriving the dialing signals, and means for supplying the enabling signal to the means for deriving the dialing signals in response to the third control signal being derived after the first control signal has been derived or in response to the fourth control signal being derived.

11. The apparatus of claim 7 further including counter means responsive to the second and third signals for indicating the number of connected subscriber stations that did not stay on the line for the entire message.

12. Apparatus for automatically supplying a prerecorded message via a telephone line to a plurality of telephone line subscriber stations in sequence, said line applying signals to the apparatus in response to an operator at a called subscriber station connecting his station to the line, comprising multistage shift register means for deriving a plurality of sequential output signals, N of said stages being provided for the N digits of each subscriber station number, means responsive to activation of said N stages for sequentially deriving each of the N digits of a subscriber station number and for applying the digits to the line to call a subscriber station number, means for changing the value of a digit of a subscriber station number in response to the shift register means being activated to a first stage other than the N stages, means for coupling the recorded message to the telephone line in response to the called station being connected to the line, means for deriving a first control signal in response to the prerecorded message being completed, means for advancing the shift register to a second stage other than the N stages after all of the digits of the called number have been applied to the line, means responsive to the register being in the second stage for a predetermined time and the called station not having been connected to the line for deriving a second control signal, and means responsive to the first and second control signals for energizing the shift register to activate the N stages and the first stage in sequence so that the digits for the changed subscriber station number are applied in sequence to the line and the subscriber station number is changed.

\* \* \* \* \*